(No Model.) 6 Sheets—Sheet 1.

J. GARDNER.
TYPE WRITING MACHINE.

No. 463,860. Patented Nov. 24, 1891.

FIG. 1.

Witnesses,
Stephen Jannus
Geo. Snyder.

Inventor.
John Gardner,
By Geo. P. Whittlesey
Atty.

(No Model.) 6 Sheets—Sheet 2.

J. GARDNER.
TYPE WRITING MACHINE.

No. 463,860. Patented Nov. 24, 1891.

Witnesses
Stephen Jammus
Geo. Snyder.

Inventor,
John Gardner,
By Geo. H. Whitesey
atty.

(No Model.)  
6 Sheets—Sheet 3.

J. GARDNER.
TYPE WRITING MACHINE.

No. 463,860.  
Patented Nov. 24, 1891.

(No Model.) 6 Sheets—Sheet 4.

J. GARDNER.
TYPE WRITING MACHINE.

No. 463,860. Patented Nov. 24, 1891.

Witnesses,
Stephen Jammus
Geo. Snyder

Inventor,
John Gardner,
By Geo. F. Whitney
Atty.

(No Model.) 6 Sheets—Sheet 5.

J. GARDNER.
TYPE WRITING MACHINE.

No. 463,860. Patented Nov. 24, 1891.

Witnesses:
Stephen Jannus
Geo. Snyder

Inventor,
John Gardner,
By Geo. P. Whittlesey
Atty.

THE NORRIS PETERS CO., PHOTO-LITHO., WASHINGTON, D. C.

(No Model.)  6 Sheets—Sheet 6.
J. GARDNER.
TYPE WRITING MACHINE.
No. 463,860. Patented Nov. 24, 1891.

Witnesses,
Stephen Jannus
Geo. Snyder

Inventor,
John Gardner,
By Geo. F. Whitney
Atty.

THE NORRIS PETERS CO., PHOTO-LITHO., WASHINGTON, D. C.

United States Patent Office.

JOHN GARDNER, OF MANCHESTER, ENGLAND.

TYPE-WRITING MACHINE.

SPECIFICATION forming part of Letters Patent No. 463,860, dated November 24, 1891.

Application filed March 16, 1891. Serial No. 385,323. (No model.) Patented in England June 7, 1890, No. 8,831, and November 7, 1890, No. 17,773.

*To all whom it may concern:*

Be it known that I, JOHN GARDNER, a citizen of the United Kingdom of Great Britain and Ireland, and a resident of Manchester, in the county of Lancaster, England, have invented certain new and useful Improvements in Type-Writing Machines, (patented in Great Britain June 7, 1890, No. 8,831, and November 7, 1890, No. 17,773,) of which the following is a specification.

This invention relates principally to key type-writing machines in which the keys or the stems of the keys are employed to operate the machine directly without the use or interposition of key-levers.

I will describe my present improvements with reference to the accompanying drawings, in which—

In each of the figures similar parts or details are denoted by similar letters of reference.

Figure 1:
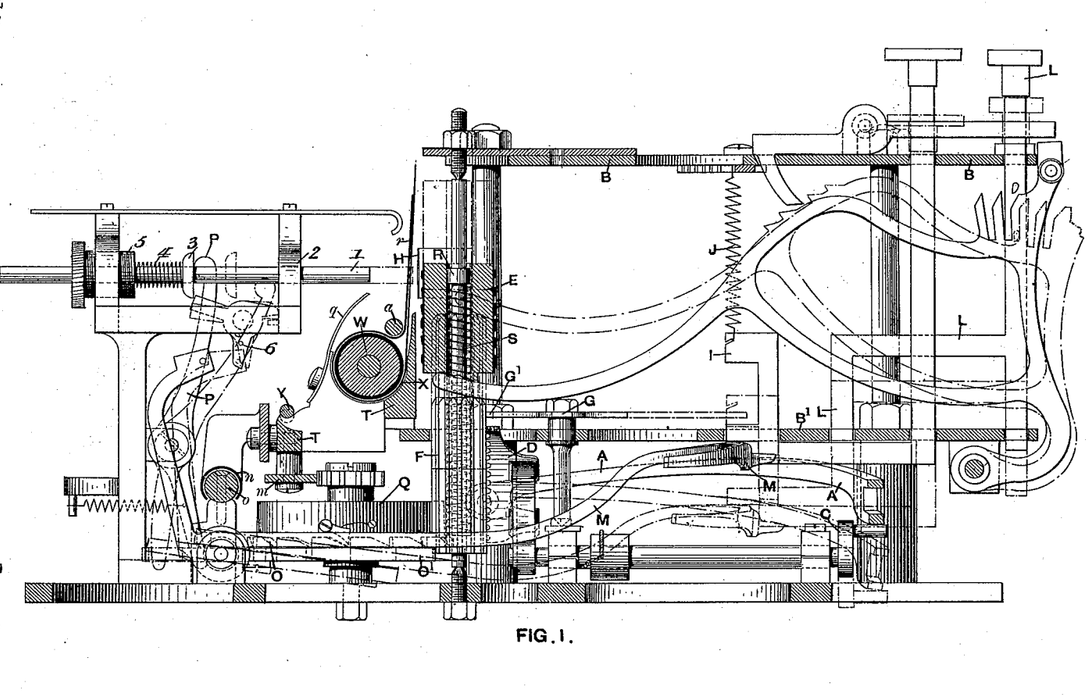
Figure 1 represents a sectional side view of the machine.
Figure 2:
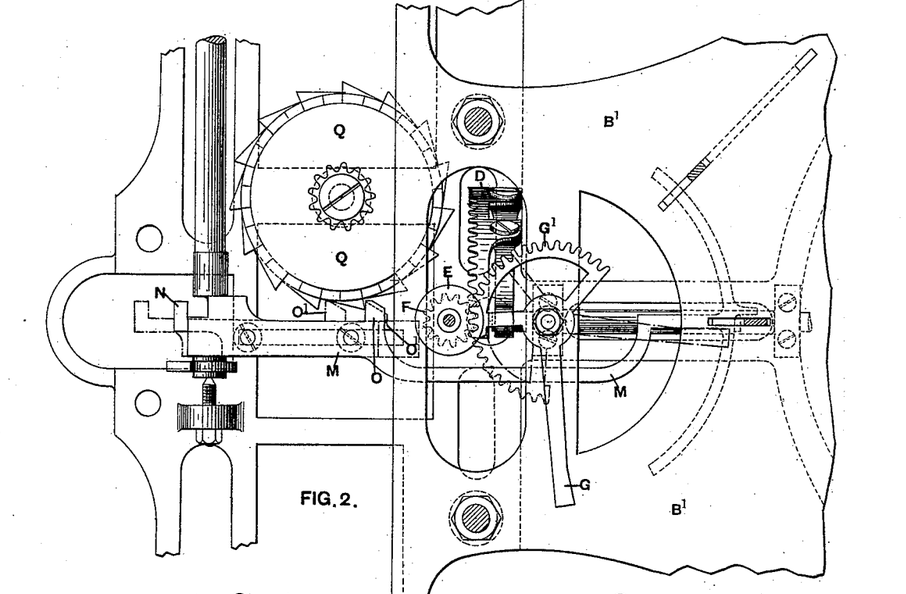
Fig. 2, a partial sectional plan showing the spacing and stop motions.

In order to increase the stability of the machine and thus to avoid much of the noise and vibration in working, and in order, further, to enable a type-sleeve or type-cylinder to be more conveniently used in the machine instead of a type-segment, I arrange the diagonal arc lever A below the lower plate B', the crank C and the crank-segment D being placed below the inclined arc lever A. The use of a type sleeve or cylinder E instead of a type-segment, while it avoids the momentum of the segment, involves a greater angular motion for the printing-surface, and I arrange for this by causing the crank quadrant or segment D to engage with a pinion of small diameter. The stop-finger G is horizontally pivoted on a stud rising from the lower plate B'. It is provided with a quadrant G', gearing directly with the type-sleeve, as shown in Figs. 1 and 2, the finger moving above the lower plate being driven from the type-sleeve, as shown in Figs. 1 and 2, and the stop-finger G, instead of moving below the lower plate, moves above it. The ratio between the stop-finger quadrant G' and the type-sleeve pinion F may be fixed at will, so as to obtain motion through any desired arc for the maximum motion of the type-sleeve.

Figure 12:
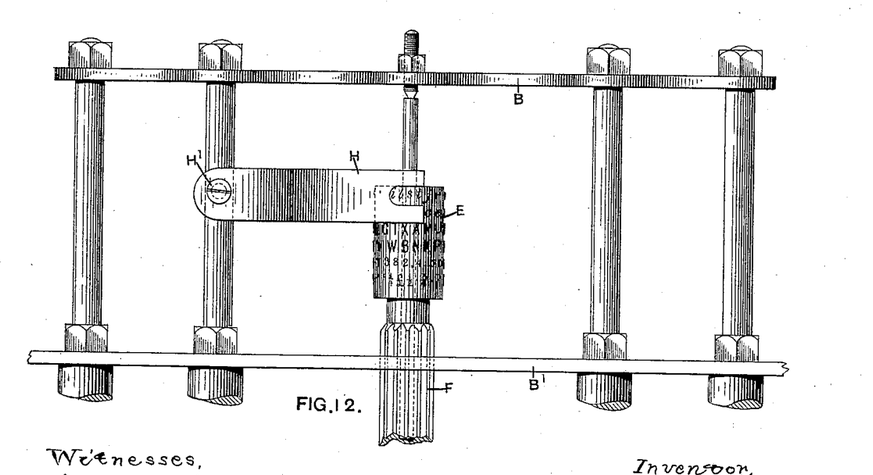
Fig. 12, a back elevation of the impression-guard.

The impression-shield H is formed with a slot, as shown at H, Fig. 12. The shield may be secured to one of the pillars of the machine by means of a set-screw H', passing through a suitable hole in the end of the shield. The absence of material on the side of the opening through which the impression is made completely removes the possibility of the shield smearing the writing.

The lower parts of the key-stems act upon the lever A directly below the lower plate B'. The lower ends of the type-key stems are turned in a horizontal direction toward the center of the type-sleeve spindle and at a short distance are again turned upward, so that these upturned parts pass through suitable openings formed in the lower plate. These upturned parts have slots or recesses formed in them, or they have at their upper extremities a returned part or projection I, Fig. 1, so that when the keys are in their normal position the stop-finger G can sweep through the recesses or below the returned parts I; but when any particular key is depressed, as shown by the dotted lines in Fig. 1, the stop-finger will come into contact with the upturned part of that particular key-stem, its motion being thereby arrested, and the type-sleeve is consequently also stopped in one particular position. Arrangements are made by spacing the letters on the printing-field to insure that the sleeve will always be stopped by the contact of the stop-finger with the key-stem belonging to the letter or character which is desired to be printed when that letter or character is in front of the impression-ram. The extreme end of each type-key stem is connected by means of a spiral spring J with a projection formed in or connected to the upper plate, the action of the spring being to restore the key to its normal position after it is released.

Figure 11:
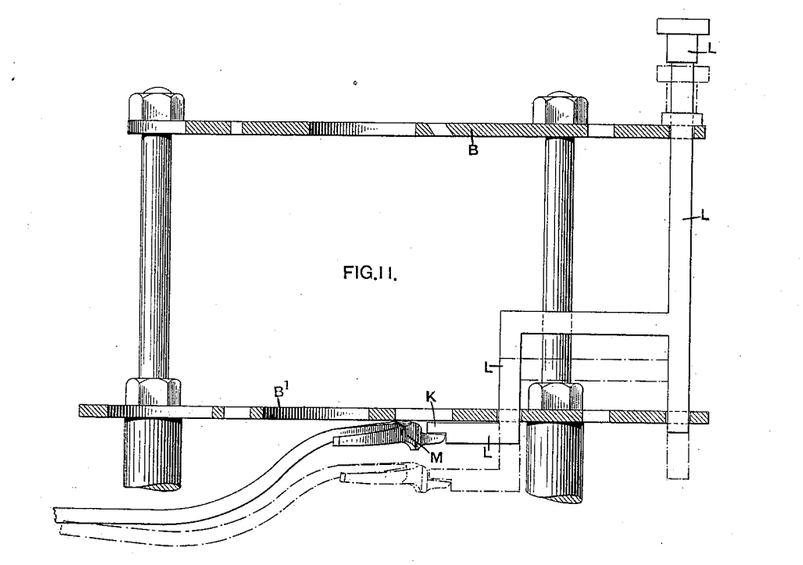
Fig. 11, an elevation of the shift-key and quadrant-lever.

According to these improvements I employ the shift-key L for spacing. For this purpose I form a branch K upon the shift-key stem in such a manner and in such a position that when the shift-key is depressed the branch K will come into contact with and operate the quadrant-lever M, (or a projection therefrom,) which actuates the spacing motion. This shift-key is separately shown in elevation in Fig. 11, where its normal position is indicated in full lines and its position when used for spacing is indicated in dotted lines. It is to be noted, however, that the arc lever is still further depressed when used with the type-keys for writing.

In arranging the fixed and the sliding dogs, which engage with the teeth of the escape-wheel and which are employed in the letter-spacing and in the ram-resetting motions, I form the fixed dog O upon the stem of the quadrant spacing-lever M and arrange the sliding dog O' immediately below it, as shown in Figs. 1, 2, 13, and 14. The dog O' is carried on a plate arranged to slide a limited distance on the lever M and having attached to it a spring which tends to draw it back out of line with the fixed dog O. When the machine is not being operated, the dog O' lies vertically under the dog O and in engagement with one of the teeth of the escape-wheel Q. So soon, however, as one of the type-keys is depressed, the projection I forces down the lever M, and this pushes the dog O' out of engagement with the tooth of the escape-wheel Q, but at the same time brings down the dog O into engagement with the same tooth. The dog O' upon being freed from the escape-wheel is pulled back by its spring into the position shown in dotted lines in Fig. 2, where it is ready to engage with the next tooth of the escape-wheel. As soon as the type-key is released the lever M rises, lifting the dog O out of engagement with the escape-wheel and bringing the dog O' into the path of the next tooth of said wheel. Inside the escape-wheel is a coiled spring, which, when the dog O releases its tooth, rotates the wheel, and thereby pulls the dog O' forward to its first position under the dog O, where it is stopped. Thus for every depression of a type-key the escape-wheel Q rotates through the space occupied by one tooth. The motion of the escape-wheel is communicated to the paper-carriage by means of a pinion which engages with the rack m. The sliding dog O' carries a hook N, which engages with and operates the resetting-lever P and operates also to reset the impression-ram when the sliding dog is pulled forward by the escape-wheel Q—that is to say, as soon as the lever is lifted on its return stroke with its fast dog out of contact with the teeth of the escape-wheel.

The impression hammer or ram 1 slides horizontally in bearings 2 and carries a collar 3, serving as an abutment for a helical spring 4, the tension of which is adjustable by means of the threaded sleeve 5. When the ram is set, the spring is compressed and a weighted pivoted detent 6 engages with the collar and holds the ram in position. Upon the depression of the lever M the forward movement of the hook N trips the detent and allows the ram to deliver a blow. When the lever M rises and the hook N moves back, it actuates the resetting-lever P, which engages with the collar 3 and forces the ram back far enough for the detent 6 to once more catch said collar.

The type sleeve or cylinder constructed according to these improvements may be adapted not alone to the machine herein described, but also to other machines in which a sliding type sleeve or segment is employed.

The central hole in the type-sleeve E is bored or otherwise formed larger than the diameter of the spindle, except at the lower end, where it is formed to fit upon the spindle truly, Fig. 1. On the spindle, at a point corresponding with the upper end of the type-sleeve, I form upon the spindle a fast collar or enlargement R to fit the bore of the sleeve. There will thus be an inclosed annular space within the type sleeve in which there is placed a spiral spring S around the spindle, one end of the spring abutting upon the material of the sleeve at the point where the bore is contracted to fit the spindle and the other end upon the enlarged part or collar R. By this arrangement when the type-sleeve has been shifted upon the spindle, as shown in dotted lines in Fig. 1, the spiral spring forces it back into its normal position on the release of the shift-key.

Figures 3, 4, 5, 6, 7, 8:
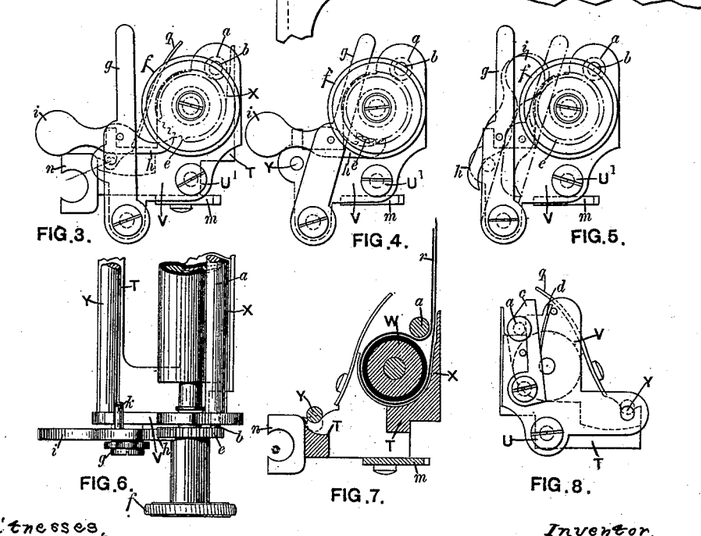
Figs. 3 to 10, inclusive, details of the paper-carriage.
Figure 9:
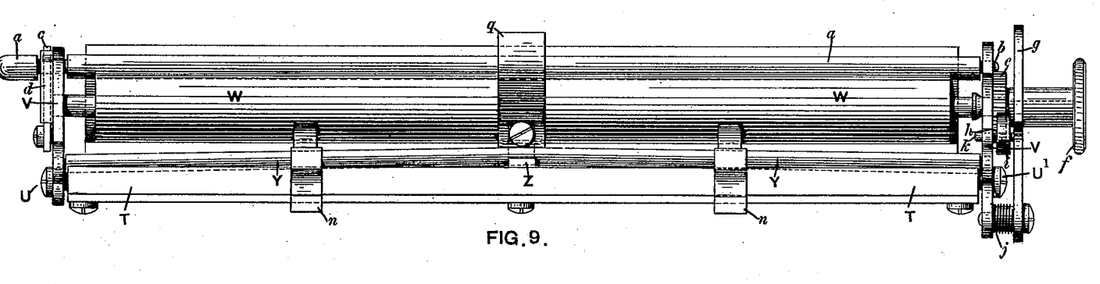
Figure 10:
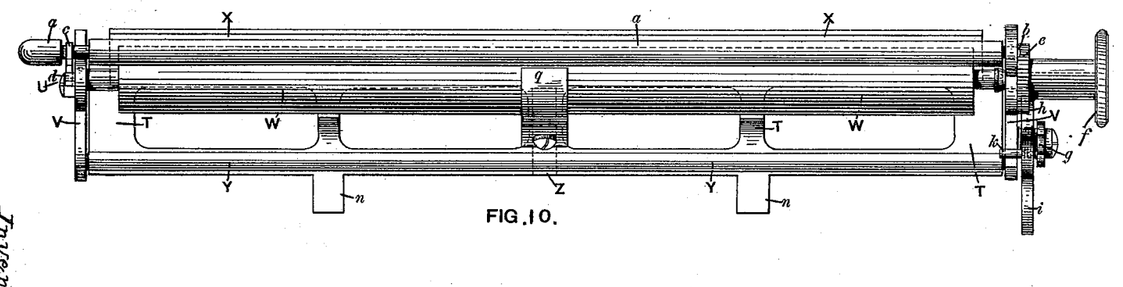

To secure a more uniform feed for the paper and to prevent the defect known as "winding," I construct the paper-carriage and feed-motion as represented by Figs. 3 to 10, inclusive. The rigid frame-work T of the carriage has at its opposite ends coaxial pivots U U', upon which the loose ends V V are mounted. The paper-feed roller W is mounted on an axis or spindle which has its bearings in the loose carriage ends V V, and it is arranged to press uniformly against a solid or rigid part X of the carriage T. This part X of the carriage T is constructed and arranged to be continuous with and to lie parallel to the paper-feed roller and its inner surface is preferably curved to suit the roller, as shown in Figs. 1, 7, and 8, which illustrate, respectively, transverse sections and an end elevation. The close and uniform contact between the roller W and the part X is secured by means of a light rod Y, constructed of steel or other springy metal mounted upon the loose carriage ends parallel with the feed-roller and bearing in the middle of its length upon an abutment Z on the carriage-frame in such a manner that the rod is slightly bent, as is shown by Fig. 9, which is a back elevation of the paper-carriage. This rod consequently acts as a spring, bearing with equal pressure upon each loose end V of the carriage, so that the roller W mounted therein is pressed in a perfectly uniform manner upon the part X, insuring a true and regular feed when the roller is turned on its axis. A light detachable rod $a$ is also fitted upon the carriage parallel with the roller W in such a manner that it may be readily inserted and secured in its position or be removed therefrom. A convenient method of constructing and arranging this rod is illustrated by Figs. 6, 7, 8, 9, and 10. One end of the rod is turned down to fit easily within a hole pierced in one of the ends of the loose carriage, as at $b$. A groove is turned near the other end of the rod, and this grooved part of the rod is arranged to lie within an open slot or recess in the opposite loose end of the carriage, where it is held by the notched catch $c$ and the spring $d$. This rod serves to hold the paper around the feed-roller and against the part X of the carriage, as will be hereinafter more fully described.

A ratchet-wheel $e$ and a finger knob or handle $f$ are mounted upon the end of the feed-roller spindle, and the feed-motion between the lines of writing is given to the roller by means of a lever $g$, carrying a pawl $h$, which engages with the ratchet-teeth. The pawl is pivoted on the lever $g$, so that it may be turned thereon, as shown by Figs. 3, 4, 5, and 6. The heel $i$ of the pawl is of greater weight than the point and is enlarged or has a projection thereon, so that when the pawl is put out of gear this enlargement or projecting part $i$ will come into contact with and rest upon the ratchet-wheel or upon a part of the carriage in a plane in front of the normal vertical position of the lever $g$, as in Fig. 5. When the pawl is in this position, the paper-feed roller may be turned by means of its handle freely in either direction. To put the pawl into gear with the ratchet-wheel it is necessary only to move the lever $g$ forward into the position indicated by the dotted lines in Fig. 5, when the center of gravity of the counter-weight $i$ will be brought behind its support or fulcrum, because this part, resting against a fixed part of the machine, cannot move forward with the lever. Consequently the pawl will at once fall automatically into its normal position, as indicated in Fig. 4. The feed of the paper-roller for the spaces between the lines of writing is effected by bringing the lever forward from the position shown in Fig. 3 into that shown in Fig. 4, as in ordinary ratchet-feed motions. A spring such as $j$, Fig. 9, may be employed to assist or secure the return of the lever and pawl to their normal positions.

The spaces between the lines are governed by the amount of angular motion given by the pawl to the ratchet-wheel at each stroke of the lever. The motion of this lever may be limited by a stop $k$ on the lever $g$, which travels in a recess formed in the carriage end. One end of this recess may be provided with a screw or other means for adjusting the length of travel of the lever by lengthening or shortening the recess.

The carriage-guides $n\,n$ slide upon a rod $o$, fixed in the machine, and motion is imparted to it through the rack $m$. The paper-guard is shown at $q$.

In operating the carriage the bottom edge of the paper is inserted between the roller W and the part X. The roller is then rotated backward by the knob or handle (the pawl having first been put out of gear) until the paper has been brought into the desired position for the commencement of the writing. The detachable rod $a$, which has been previously removed from the machine, is now inserted and secured in its place behind the returned lower part of the sheet of paper, thus bringing the upper and lower parts of the sheet closely parallel, as shown at $r$, Fig. 7, with the paper-roller in the loop of the paper. The blow of the impression-ram is thus given through the two thicknesses of the paper until the bottom of the sheet is nearly reached, when it is given through the single thickness only. The carriage is now slid into the position for commencing the first line of the writing, and the machine is thereafter operated in a manner similar to that employed in working ordinary type-writing machines of a similar class.

Figure 13:
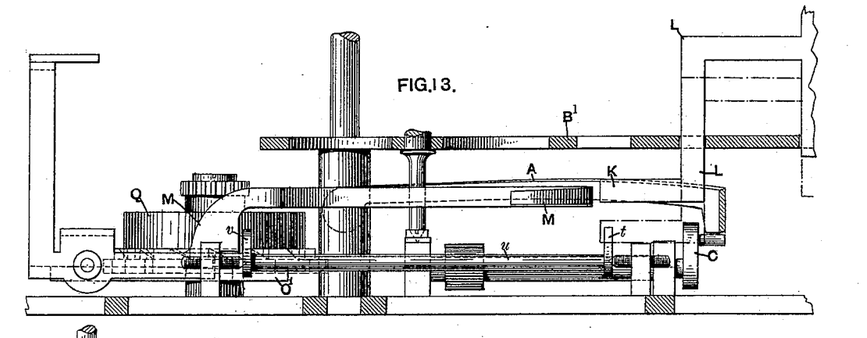
Fig. 13, a partial vertical section of the spacing mechanism.
Figures 14, 15:
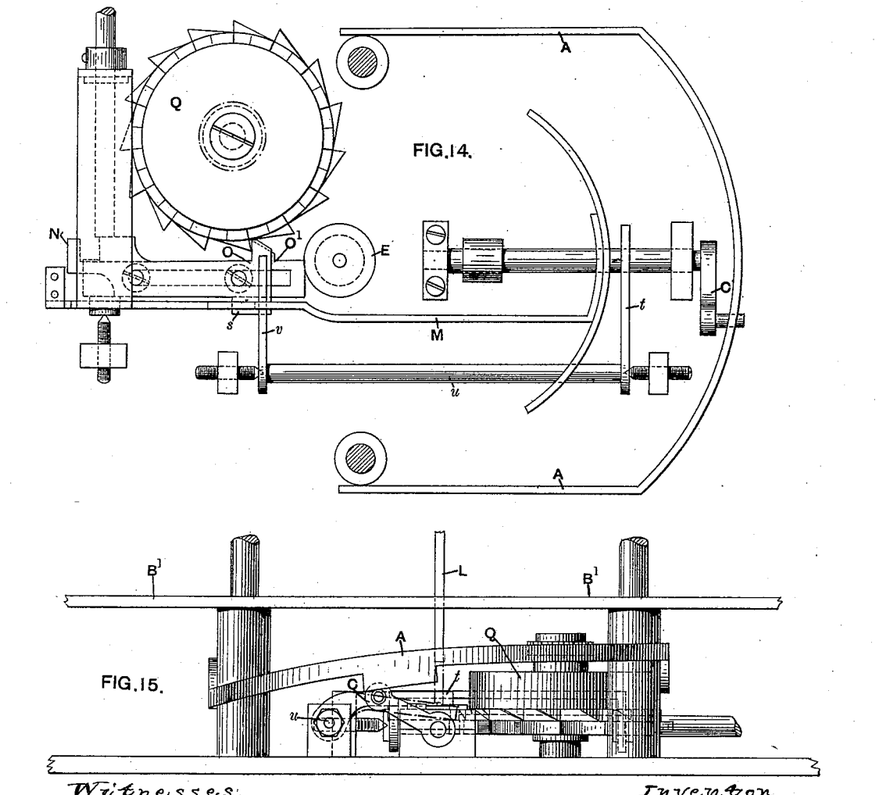
Fig. 14, a plan.
Fig. 15, a front elevation of the spacing mechanism.

I order to prevent the possibility of an impression being made upon the paper when the spacing-key is used for spacing only and not in combination with a writing-key, I may employ the arrangement illustrated by Figs. 13, 14, and 15. Fig. 13 is a sectional side view, Fig. 14 a plan, and Fig. 15 a front view. Alongside of the stem of the quadrant-lever M and parallel therewith I mount the fast and loose dogs on an arm pivoted on the same axis as the lever M, instead of mounting them on the lever M, as hereinbefore described. On this arm there is formed the projection $s$, upon which the stem of the lever M normally rests, the stem being cranked or curved, as indicated in Fig. 13, for the purpose of clearing the arm $v$, which also rests upon the snug or projection $s$, and the other end of which is fixed upon the rocking shaft $u$. An arm $t$ is also fixed on the rocking shaft $u$ at its opposite end. The lever M operates to release the impression-hammer, as already described. Therefore if the lever M is not moved when the key is actuated no impression can be made. The spacing-key therefore, instead of being made to operate the quadrant-lever M as before, is made by means of its branch K to operate the arm $t$, fixed upon the rocking shaft $u$, and consequently to operate the spacing motion through the arm $v$ without acting upon the impression-ram release motion.

Figures 16, 17, 18:
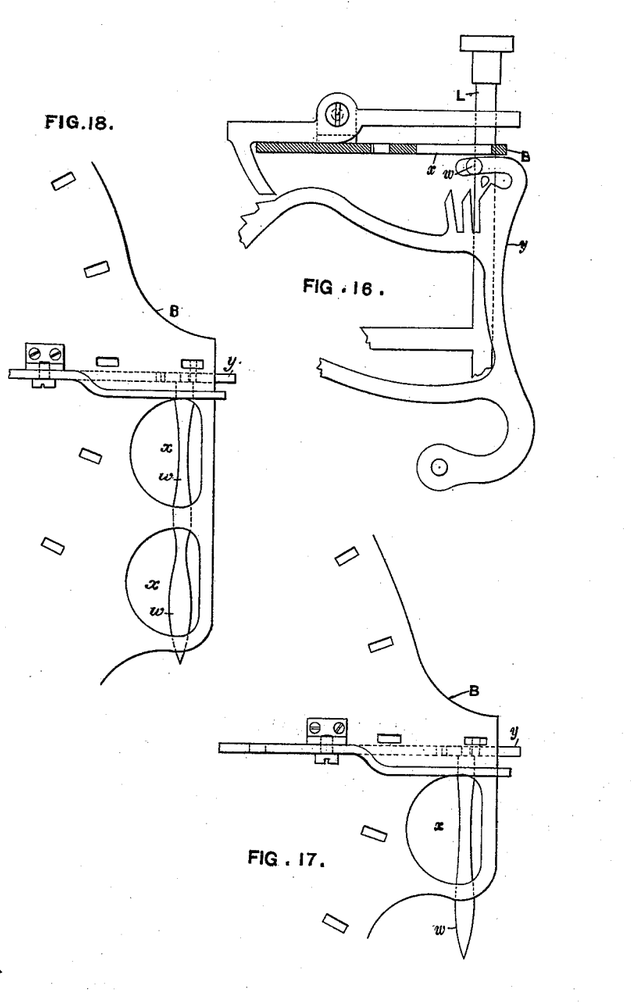
Figs. 16 and 17, elevation and plan, respectively, of a modification of the lifting-lever.
Fig. 18 is a further modification.

Instead of constructing and arranging the field-shifting lever $y$, as illustrated by Fig. 1 of the accompanying drawings, I may construct and arrange it as shown, respectively, in elevation and in plan in Figs. 16 and 17, the object of the modification being to avoid the risk of bringing the wrong field of characters into the printing position. For this purpose the field-shifting-lever handle $w$ is made longer than before, so that part of the handle comes below the opening $x$, formed in the upper plate of the machine, and so, also, that the end of the handle projects beyond the upper plate, as shown in Fig. 17. This arrangement is employed when there are three fields of type or characters, as is usually the case. To print the first field the field-shifting lever is in the normal position represented in Fig. 1 in full lines and in Fig. 16. For the second field the finger is inserted through the opening $x$ and moved toward the operator as far as the opening will permit. This act brings the field-shifting lever into the second position, where it is locked by the detent, as in existing machines, the opening being arranged to limit the motion of the finger at the required point. To bring the third field into the printing position the handle is pulled back by the operator as far as it will come, the finger being applied to the handle outside the opening $x$—that is to say, to the end of the handle. If there are four fields of types, two such openings, as $x$, are provided above the handle $w$, which is proportionately lengthened. The first opening is arranged to limit the motion to the extent necessary to bring the second field into the printing position, and the second opening to the slightly-greater extent required to bring the third field into position. The fourth field is brought into position by toutching the end of the handle $w$ outside the openings, as already described.

The machine set forth in this application constitutes an improvement upon the machine covered by my previous application filed March 7, 1890, Serial No. 343,017. Matters common to both machines are claimed in said previous application.

Having now described my invention and in what manner the same is to be performed, I declare that what I claim is—

1. In a type-writing machine, the combination and arrangement of a type-sleeve having a toothed pinion formed thereon, with a stop-finger having a toothed segment fixed thereto gearing with the type-sleeve pinion, and a curved rack or quadrant D, fixed upon the crank-shaft and gearing with the type-sleeve pinion, substantially as set forth, and as illustrated by the accompanying drawings.

2. In a type-writing machine having a type-sleeve or type-segment, a stop-finger having a quadrant fixed thereon gearing with a pinion fixed upon the type sleeve or segment, means for actuating the type sleeve or segment and thereby moving the stop-finger, and a series of keys adapted to arrest the movement of the stop-finger, substantially as set forth, and as illustrated by the accompanying drawings.

3. In a type-writing machine such as is hereinbefore described, key-stems bent twice at right angles and having a stop formed upon the upturned part which, when the key is depressed, will come into the path and arrest the further motion of the stop-finger, substantially as hereinbefore set forth, and as illustrated by the accompanying drawings.

4. In a type-writing machine, the combination and arrangement, with key-stems bent twice at right angles, of a stop-finger geared with the type-sleeve pinion and arranged to come into contact with the upturned part of each type-key stem on the depression of the type-key, substantially as set forth, and as illustrated by the accompanying drawings.

5. In a type-writing machine such as is hereinbefore described, the combination, with the shift-key, of a branch or projection K thereon, and the quadrant-lever M, through which the spacing and impression motions are operated, substantially as set forth, and as illustrated by the accompanying drawings.

6. In a type-writing machine such as is hereinbefore described, the combination, with the shift-key, of a branch or projection K thereon, a rocking shaft $u$, having the arms $t$ $v$ fixed thereon, of which the arm $t$ is actuated by the projection K, and an arm carrying the fast and loose spacing-dogs O O', operated by the arm $v$, substantially as set forth, and as illustrated by the accompanying drawings.

7. In a type-writing machine, the combination of the fast and loose spacing-dogs O O' with the quadrant-lever M, substantially as set forth, and as illustrated by the accompanying drawings.

8. In a type-writing machine, the combination, with the quadrant-lever M, of a parallel arm on which the quadrant-lever normally rests and carrying the fast and loose dogs O O', a rocking shaft $u$, having two arms fixed thereon, and a shift-key operating one of the arms on the rocking shaft, the other arm of which operates the spacing motion, substantially as set forth, and as illustrated by the accompanying drawings.

9. In a type-writing machine, a type-sleeve capable of sliding on its spindle and having an annular space within the type-sleeve, within which a spiral spring is inclosed between a collar on the spindle and the body of the type-sleeve, substantially as hereinbefore described, and as illustrated by the accompanying drawings.

10. In the paper-carriage of a type-writing machine, the combination, with the paper-feed roller, of two pivoted loose ends in which the paper-feed roller is mounted, and a spring rod also mounted in the two pivoted loose ends and bearing at about its center on a fixed part of the carriage, substantially as hereinbefore described, and as illustrated by the accompanying drawings.

11. In the paper-carriage of a type-writing machine, the combination, with a rigid framework, of two pivoted loose ends, a spring-rod mounted in the loose ends and bearing at its center upon a fixed part of the rigid framework, a paper-roller mounted in the loose ends, and a detachable rod for securing the paper, substantially as hereinbefore described, and as illustrated by the accompanying drawings.

12. In the paper-carriage of a type-writing machine, a feed-motion for the paper-feed roller, consisting of a ratchet-wheel with a pawl mounted upon a vertical lever, the pawl being counterweighted, so that after being lifted out of engagement with the teeth of the ratchet-wheel it will again fall into engagement when the lever is pulled forward, constructed substantially as hereinbefore described, and as illustrated by the accompanying drawings.

13. In a paper-carriage of a type-writing machine, a feed-motion for the paper-roller, consisting of a ratchet-wheel, a vertical lever carrying a counterweighted pawl, and a stop on the vertical lever working in a recess in the carriage end, substantially as hereinbefore described, and as illustrated by the accompanying drawings.

14. In a paper-carriage of a type-writing machine, the combination, with a detachable rod for securing the paper, of a catch engaging with a groove in the rod, and a spring for keeping the catch in engagement, substantially as hereinbefore described, and as illustrated by the accompanying drawings.

15. In a type-writing machine such as is hereinbefore described, the arrangement below the lower plate of the machine of an inclined arc lever A, the crank or wrist pin, and the quadrant on the crank-shaft engaging with and driving a pinion formed below the type-sleeve, substantially as set forth, and as illustrated by the accompanying drawings.

16. In a type-writing machine in which the impression is made by means of a ram or hammer, the combination and arrangement, with the sliding dog O', of a hook N and a hammer or ram-resetting lever, substantially as hereinbefore described, and as illustrated by the accompanying drawings.

17. In a type-writing machine, the combination and arrangement, with the field-shifting lever, of a lengthened handle w, and an upper plate or part of the machine having an opening, such as x, through which the finger may be inserted to move the handle to a limited extent only, substantially as hereinbefore described, and as illustrated by the accompanying drawings.

In testimony that I claim the foregoing as my invention I have signed my name, in presence of two witnesses, this 31st day of January, A. D. 1891.

JOHN GARDNER.

Witnesses:
GEO. W. ROWE,
GEO. HEYS.